United States Patent [19]

Bossons et al.

[11] 3,983,467

[45] Sept. 28, 1976

[54] COARSE/FINE SHEETER CONTROLS IN PARTICULAR AND MACHINE DRIVE SYSTEMS IN GENERAL

[75] Inventors: Walter Howard Bossons; Colin George Langworthy, both of Bristol, England

[73] Assignee: Masson Scott Thrissell Engineering Limited, Bristol, England

[22] Filed: Nov. 15, 1974

[21] Appl. No.: 524,343

[30] Foreign Application Priority Data

Nov. 17, 1973 United Kingdom............... 53476/73

[52] U.S. Cl................................. 318/593; 318/624
[51] Int. Cl.²....................... G05F 1/46; G05B 7/02
[58] Field of Search..................... 318/593, 591, 624

[56] References Cited
UNITED STATES PATENTS

| | | | |
|---|---|---|---|
| 1,539,187 | 5/1925 | Hewlett et al. ...................... | 318/593 |
| 2,697,190 | 12/1954 | Andersson ...................... | 318/593 X |
| 2,751,535 | 6/1956 | Kuhnel................................ | 318/593 |
| 2,798,992 | 1/1957 | Adler et al.......................... | 318/593 |
| 3,323,030 | 5/1967 | Inaba et al.......................... | 318/593 |
| 3,441,818 | 4/1969 | Tiskus et al........................ | 318/624 |
| 3,688,642 | 9/1972 | Negoro ........................... | 318/593 X |
| 3,775,837 | 12/1973 | Tomita et al. .................. | 318/593 X |

*Primary Examiner*—Gene Z. Rubinson
*Attorney, Agent, or Firm*—Young & Thompson

[57] ABSTRACT

A machine drive system includes two motors which are to be driven with a selected velocity ratio. To one of these motors a coarse control is applied, and which the velocity ratio approximates the desired value, a fine control is applied to the other motor. The system may be hydraulic or electric. The hydraulic version employs a single pump to drive the two motors, and the fine control is conveniently a valve in a fluid line bypass around the associated motor. An error signal obtained from a comparison of the two speeds is used to govern the coarse/fine control.

5 Claims, 3 Drawing Figures

COARSE/FINE SHEETER CONTROLS IN PARTICULAR AND MACHINE DRIVE SYSTEMS IN GENERAL

This invention relates to machine drive systems. It is particularly concerned with systems where there are two drives not necessarily running at the same speed or at constant speeds but with a speed ratio which is required to be adjusted to predetermined values. This occurs in machines for cutting continuous webs of sheet material into individual sheets. The material is fed through draw or press rolls to knife drums. The relative speeds of the draw rolls and the knife drums determine the sheet length, and the speed ratio is normally established by the use of an infinitely variable gearbox.

The usual arrangement is to drive the press rolls at substantially constant speed and the knife drums from that drive via the gearbox. This is normal because it is easier to deliver the paper or other sheet material at constant speed. However, the reverse arrangement is not unknown. The efficiency and performance of such a sheeter is largely dependent on the gearbox, but in their existing forms they have considerable shortcomings, for example in repeatability of settings and long service life and the range through which they can be varied, this latter limiting the range of cut sheet sizes. They are also expensive.

It is an object of this invention to eliminate such a gearbox and to have two separate drives which can, however, be maintained accurately in a predetermined relationship.

According to the present invention there is provided a machine drive system wherein two motors are arranged to drive with a selected velocity ratio, one motor having a coarse control for adjustment of its speed to within a given range of desired speeds, and the other motor having a fine control, operable when said given range is achieved, for adjustment of its speed to one giving a desired velocity ratio in relation to the speed of said one motor.

This system is workable with hydraulic or electric motors. With hydraulic ones, they are conveniently connected in series and served by a common pump. Said other motor may then have a bypass with fine adjustment means therein, for example a high resolution and fast acting hydraulic servo valve, which will trim the fluid flow through that motor. Said one motor may be of the variable delivery type, for example a swash plate motor, the tilt of the swash plate constituting the coarse adjustment. The separation of the coarse and fine control, one to each motor, gives a speedy response. In the hydraulic case it eliminates the requirement of having a servo valve with a very small thresh-hold and yet a large flow capability, which are in practice incompatible properties.

The control is conveniently effected by making a comparison between a set velocity ratio and the ratio of speeds detected from the motors. An error signal can thus be obtained and this may be shaped in analogue amplifiers to give correction signals to each motor. The amplifier associated with said one motor preferably has a dead band at low or zero error signals, which band corresponds to said range. The amplifier associated with the motor will be active only when such low or zero error signals exist. The overall speed of the system can be changed by a separate control, and with electric motors this is conveniently applied to said other motor. With hydraulic motors served by a single variable delivery pump, adjustment of the latter will change the overall speed.

In the application of this system to a sheeter, the press rolls will preferably be the ones that are finely adjusted and the knife drums will have the coarse adjustment.

The invention may be performed in various ways and some embodiments thereof will now be described, by way of example, with reference to the accompanying drawings in which.

Figure 1:
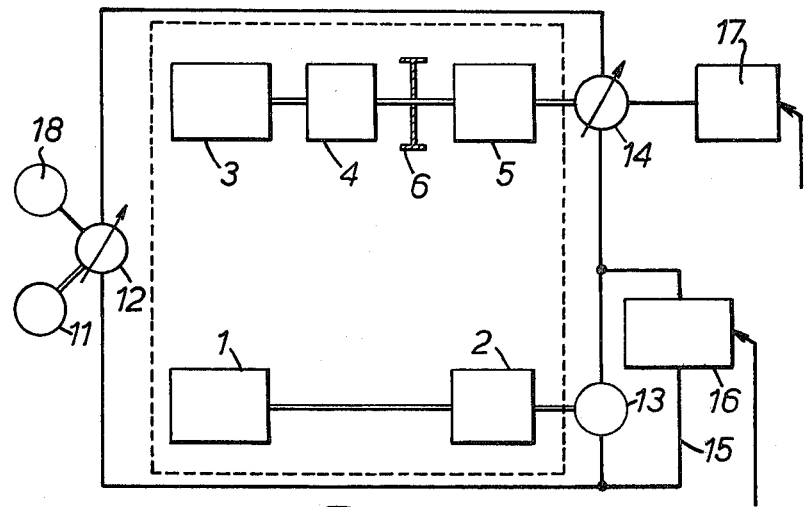
FIG. 1 is a schematic diagram of a hydraulic drive system having two motors.
Figure 2:
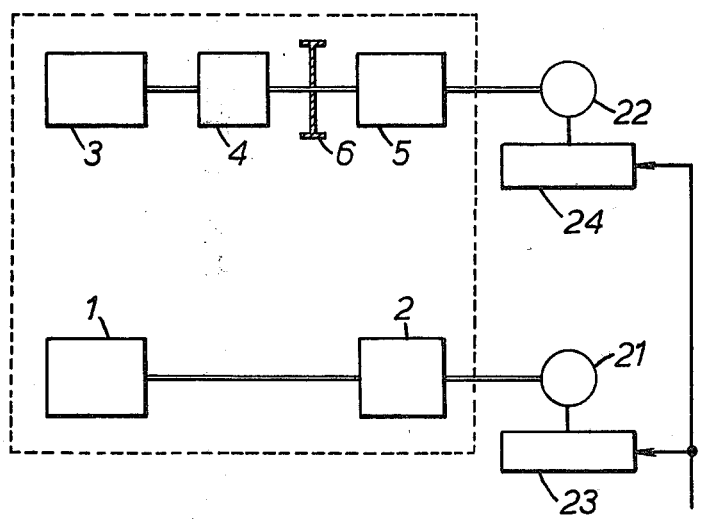
FIG. 2 is a schematic diagram of an electrical drive system having two motors.

The parts enclosed in the broken line rectangle in each of FIGS. 1 and 2 are diagrammatic representations of parts of a sheeter, that is apparatus for cutting a continuous web into separate sheets. The web is fed first through press rolls 1 to which drive is applied through a reduction gearbox 2. The knife drums 3 downstream of the press rolls are rotated with a continuously varying speed through a draglink 4 to which drive is applied through a reduction gearbox 5 and flywheel 6. The flywheel rotates at substantially constant speed and the linkage transforms this into cyclic variations which ensures that the knives are moving at substantially the same speed as the paper at the instant of cut. During the remainder of each revolution they may speed up or slow down according to the settings of the linkage.

These parts of a sheeter are described in more detail in our British Applns. Nos. 2329/72 and 40351/73. It will be understood that when the speed ratio, and hence the sheet length, is varied in the present embodiments the draglink is also adjusted automatically to keep the cutting speed the same as the delivery speed.

The hydraulic system of FIG. 1 has a prime mover 11 which drives a variable delivery main pump 12. The fluid is passed in series through the press roll motor 13 and the knife drum motor 14. The press roll motor has a bypass 15 in which there is a high resolution and fast acting servo valve 16 by which the flow through the press roll motor can be trimmed. A suitable valve for such a purpose is the MOOG type 61E/263. A control signal is applied to this valve and how it is derived will be described later. The knife drum motor 14 is a variable delivery swash plate type externally controlled using a remote positional control motor 17.

It will be understood that the overall machine speed may be controlled by adjusting the main pump delivery by set speed control 18. The cut sheet length is basically set by adjustment of the knife drum motor swash plate and when this is approximately to the desired value the press roll motor speed is marginally adjusted for exact and consistent cutting.

The system of FIG. 2 has two separate speed controlled electric motors 21 and 22 for the press rolls 1 and the knife drums 3 respectively. That for the knife drums will usually be more powerful than that for the press rolls. The coarse adjustment will again be to the knife drums and the fine adjustment to the press rolls by drive control circuits 24 and 23.

Figure 3:
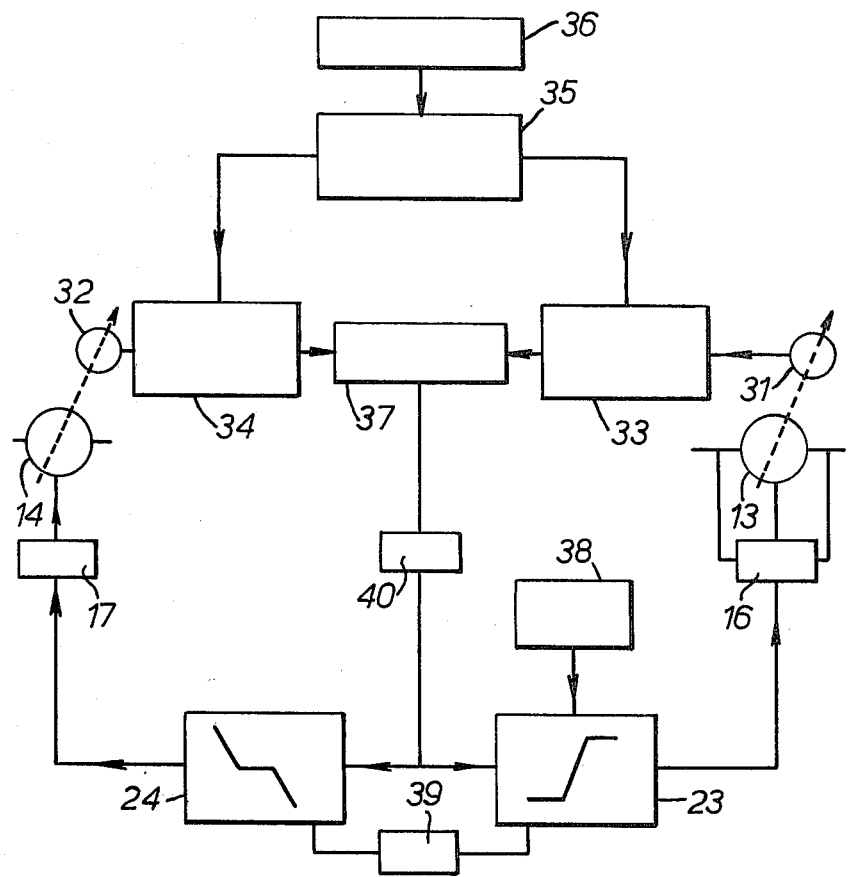
FIG. 3 is a block diagram of an electronic control circuit for either of the systems of FIGS. 1 and 2.

The electronic circuit for providing the control signals is shown in FIG. 3, in which the motors are referenced as the hydraulic motors of FIG. 1. Associated with the motors are pulse generators 31 and 32, which may for example produce a thousand pulses per revolution, which should give sufficiently high resolution. The pulses from these are fed to respective dividers 33 and 34 which also have inputs from an arithmetic unit 35. A manual input unit 36, in the form of a set of decade number switches, enables a required speed ratio, corresponding to the desired sheet length, to be set and fed to the arithmetic unit 35. This input is converted into two factors in the unit 35 and these set up the two programmable dividers 33 and 34 which divide down the pulse generator outputs to equality at the required ratio and this equality, or otherwise, is detected by a comparator 37. In other words, when the two motors are running with the desired speed ratio there is a zero signal from the comparator. However, when their speed ratio departs from the one which is set, there is an error signal. The comparator signals are applied to control circuits 23 and 24 which respectively govern the motors 13 and 14 through valve 16 and control motor 17.

The characteristic of the circuit 24 that controls the knife drum motor is indicated in the block. It has a moderate slope with a one per cent dead band about zero. Thus when the error signal is zero or only marginally either side of zero the dead band is operative and no adjusting signal is applied to the knife drum motor 14. For larger error signals corrective action is taken by a thyristor controller forming part of this circuit. The circuit 24 may also include, as is usual with thyristor controllers, additional analogue stages of shaping, current limiting and acceleration control. It may also be necessary to provide an associated integrating circuit to which the error signals are applied, before the circuit 24.

The control circuit 23, which also receives the error signal, has a characteristic such that it exerts no fine control until the knife drum drive has entered its dead band. In other words it is only active when there is a zero or marginal error signal. Within this active zone, however, it has a high slope and provides fully regenerative control with a tight and accurate speed lock on the press roll drive through the servo valve 16. Again, this controller preferably incorporates all the well known shaping and current limiting circuits.

In the electric version, this controller 23 is governed by a control unit 38, by which the overall machine speed is adjusted.

It has been assumed above that the controlling actions of the circuits 23 and 24 are mutually exclusive, in that while one is active the other is passive. However a slight overlap can be tolerated, or there could be provided a mutually connected inhibit circuit 39 to ensure that only one of the circuits 23 and 24 is operative at a time.

Instead of the characteristics of the controllers 23 and 24 being selected to determine which is performing at any one time, this selection can be made using the output of the comparator 37, which is conveniently an analogue conversion of a pulse count, or the actual comparative pulse count itself. Thus, if the comparison indicates a substantially correct speed ratio, a selector circuit 40 will activate the controller 23 and de-activate the controller 24, while if the speed ratio gives a comparative pulse count exceeding a certain number (or a given analogue equivalent) the selector circuit reverses the activation of the controllers. With such a switching arrangement, it will not be necessary for the controllers to have characteristics with dead bands.

As explained in our co-pending Appliation No. 40351/73 there are disturbances in systems using draglinks, due to the various inertias. The above described coarse and then fine control is well adapted to cope with these and it is expected that a final trimming capability of 0.01% may be achieved, or even better.

We claim:

1. A continuous web cutting machine comprising rotary web feed mechanism, rotary cutting means downstream thereof and means for driving the feed mechanism and the cutting means at a selected average velocity ratio, wherein the improvement comprises providing respective separate variable speed electric motors continuously to drive the feed mechanism and the cutting means, coarse motor control means for governing the cutting means motor to adjust the speed of the latter to within a given range, and fine motor control means, operable when said given range is achieved, for governing the feed mechanism motor to achieve said selected average velocity ratio.

2. A machine according to claim 1, wherein there are means providing signals representing a desired velocity ratio and means detecting the actual velocity ratio of the motors, and means for comparing the desired and actual velocity ratio signals to provide an error signal which serves to correct each motor control means.

3. A machine according to claim 2, wherein said coarse control means includes a control circuit, arranged to receive said error signal, which has a dead band corresponding to said given range of desired speeds and to low or zero error signals, and said fine control means includes another control circuit arranged to receive said error signal, which is active substantially only when such low or zero error signals exist.

4. A machine according to claim 3 wherein means are provided for inhibiting control by one circuit while the other is active.

5. A machine according to claim 2 wherein selector means responsive to the comparison means is arranged selectively to activate one or other of control circuits for said motors in accordance with the magnitude of said error signal.

* * * * *